United States Patent
Dyson

(10) Patent No.: US 8,953,622 B2
(45) Date of Patent: Feb. 10, 2015

(54) METHOD AND APPARATUS FOR JITTER BUFFERING WITHIN A COMMUNICATION SYSTEM

(75) Inventor: Dean S. Dyson, Whitchurch (GB)

(73) Assignee: Motorola Solutions, Inc., Schaumburg, IL (US)

(*) Notice: Subject to any disclaimer, the term of this patent is extended or adjusted under 35 U.S.C. 154(b) by 352 days.

(21) Appl. No.: 13/299,483

(22) Filed: Nov. 18, 2011

(65) Prior Publication Data

US 2013/0129025 A1    May 23, 2013

(51) Int. Cl.
*H04L 12/28* (2006.01)
*H04W 28/14* (2009.01)
*H04L 12/841* (2013.01)
*H04W 28/02* (2009.01)

(52) U.S. Cl.
CPC .......... *H04W 28/14* (2013.01); *H04W 28/0247* (2013.01); *H04L 47/283* (2013.01)
USPC .......................................... 370/401; 370/412

(58) Field of Classification Search
None
See application file for complete search history.

(56) References Cited

U.S. PATENT DOCUMENTS

| 6,862,298 | B1 |   | 3/2005 | Smith et al. |   |
|---|---|---|---|---|---|
| 7,701,980 | B1 | * | 4/2010 | Bugenhagen | 370/235 |
| 2002/0037003 | A1 | * | 3/2002 | Windecker | 370/352 |
| 2006/0215669 | A1 | * | 9/2006 | Gangadharan et al. | 370/401 |
| 2008/0279183 | A1 | * | 11/2008 | Wiley et al. | 370/389 |
| 2009/0059937 | A1 | * | 3/2009 | Kanada | 370/401 |
| 2010/0278140 | A1 | * | 11/2010 | Smith et al. | 370/331 |
| 2011/0044210 | A1 | * | 2/2011 | Yokota | 370/352 |

FOREIGN PATENT DOCUMENTS

| JP | 2009272764 A | 11/2009 |
|---|---|---|
| KR | 20060081445 A | 7/2006 |

OTHER PUBLICATIONS

Notification of Grant for counterpart Great Britain Patent Application No. 1220290.9 mailed Feb. 4, 2014.
Combined Search and Examination Report for counterpart Great Britain Patent Application No. 1220290.9 mailed Apr. 8, 2013.

* cited by examiner

*Primary Examiner* — Gregory Sefcheck
*Assistant Examiner* — Joshua Smith
(74) *Attorney, Agent, or Firm* — Kenneth A. Haas

(57) ABSTRACT

A method and apparatus for performing jitter buffering is provided herein. During operation, a system will utilize variable-length jitter buffers within each receiver. Each receiver will then be assigned an appropriate jitter-buffer size based upon system constraints. In one embodiment of the present invention jitter-buffer size is adjusted on a per call (or even per call/speech segment) basis and is based on both the source and destination capabilities.

16 Claims, 3 Drawing Sheets

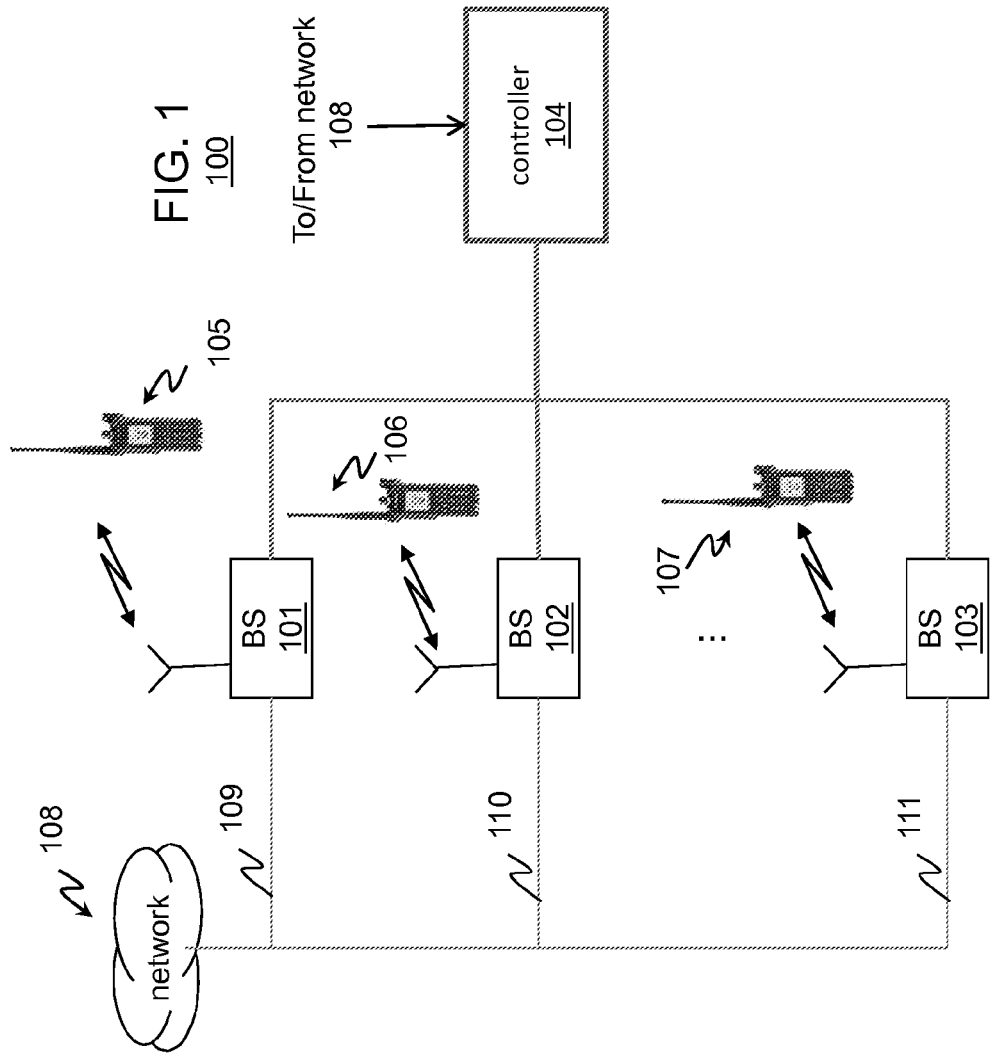

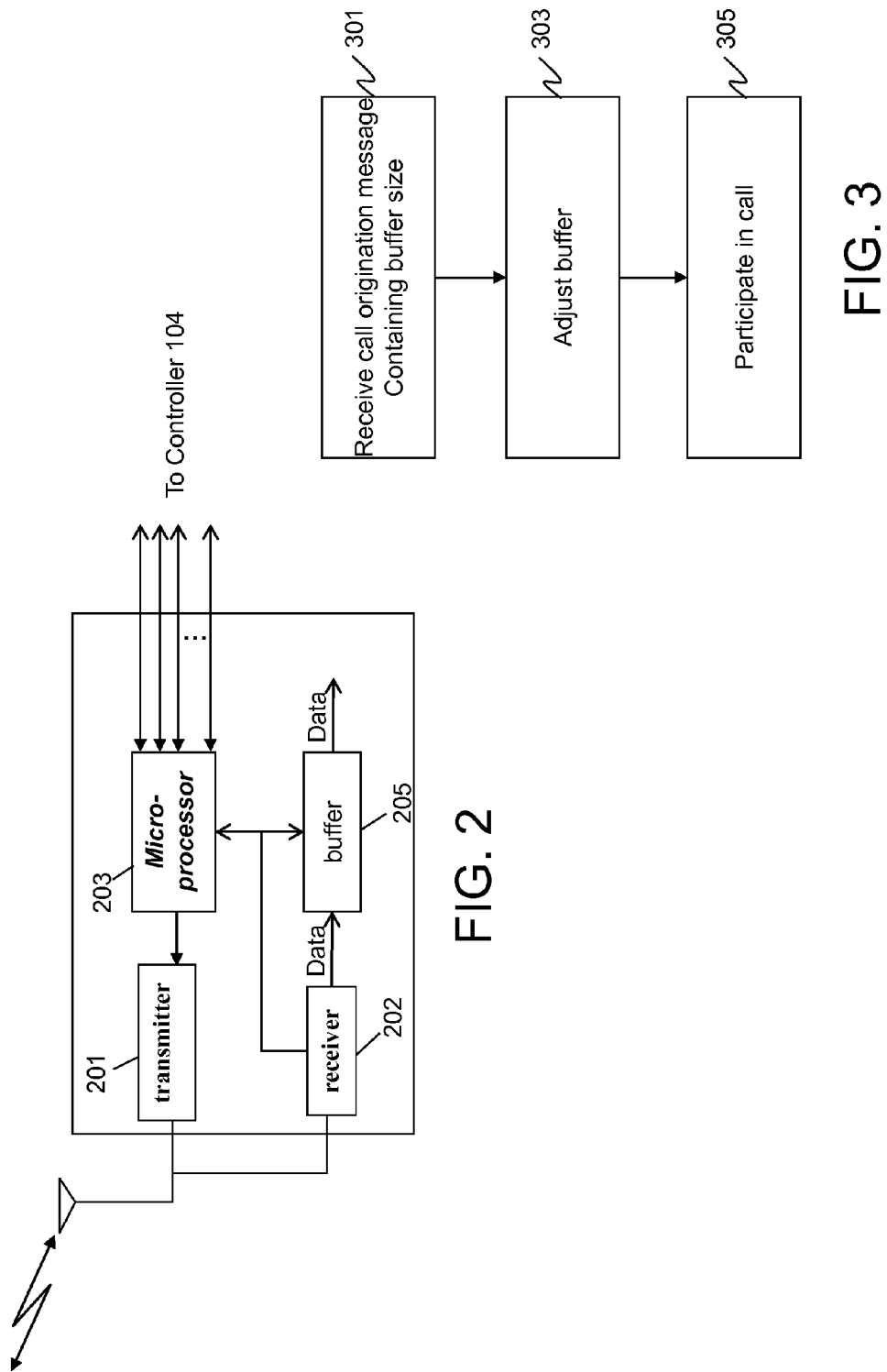

METHOD AND APPARATUS FOR JITTER BUFFERING WITHIN A COMMUNICATION SYSTEM

FIELD OF THE INVENTION

The present invention generally relates to jitter buffering, and more particularly to a method and apparatus for performing jitter buffering within a communication system.

BACKGROUND OF THE INVENTION

During normal communication system transmission, a person's voice is digitized, compressed, and divided into small packets of encoded binary data. The packets are sent over an unregulated network which results in them arriving at far-end receivers with varying amounts of delay on each packet. The far-end receivers put the packets back in the correct order then uncompresses (or, synonymously, decodes) the encoded binary data and thus provides a continuous audio signal to a listener, which sounds like a slightly delayed copy of the original voice.

In order to compensate for variable network delays jitter buffers are usually employed by the receivers. Slight jitter in arrival time is thus eliminated, as the contents of the buffer are clocked out by a synchronous local clock at the receiver. A large static jitter buffer can be designed into the receiver to optimize performance against large amounts of network delay jitter at the cost of large delays which will be noticed by users; on the other hand, a small jitter buffer can be used which will introduce minimal delays but at the cost of significant packet loss. In this case, call quality degrades when the network jitter exceeds the size of the jitter buffer.

Thus, there exists a tradeoff between long delays/low packet loss and short delays/higher packet loss. Therefore a need exists for a method and apparatus for jitter buffering within a communication system that optimizes a jitter buffer for better system performance.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 1 is block diagram of a communication system that utilizes a variable-length jitter buffer;

FIG. 2 is block diagram of a base station that may be utilized to adjust its jitter buffer.

FIG. 3 is a flow chart showing operation of the base station of FIG. 2.

Figure 5:
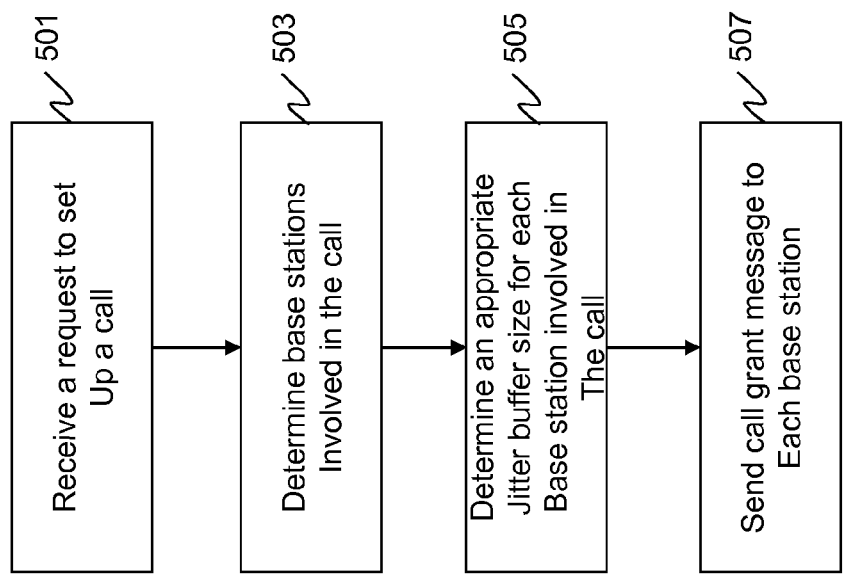
FIG. 5 is a flow chart showing operation of the call controller of FIG. 4.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for performing jitter buffering is provided herein. During operation, a system will utilize variable-length jitter buffers within each receiver. Each receiver will then be assigned an appropriate jitter-buffer size based upon system constraints. In one embodiment of the present invention jitter-buffer size is adjusted on a per call (or even per call/speech segment) basis and is based on both the source and destination capabilities.

In one embodiment of the present invention, system capabilities are loaded to a call controller and then used as part of the call granting procedure to assign an appropriate buffer size to multiple receivers. The call controller determines jitter buffer parameters for the receiving sites for a speech segment. The controller determines an appropriate buffer size for each of the receivers participating in the call and then sends a jitter-buffer size to each of the recipients of the call as part of call origination message. The jitter buffer allocated may differ for each receiver. Additionally, for the duration of the speech segment, the jitter buffers remain static. Because of this, each receiver of the call will have an appropriately-tailored jitter buffer size, overall system performance can be optimized.

The present invention encompasses a method for jitter buffering within a communication system. The method comprises the steps of receiving a request to set up a call, determining base stations involved in the call, and determining an appropriate jitter-buffer size for each base station involved in the call. The jitter-buffer size for each base station involved in the call may differ from each other. Finally, a call-initiation message is sent to each base station involved in the call. The call-initiation message sent to a particular base station includes the jitter-buffer size for the particular base station.

The present invention additionally encompasses a receiver comprising a jitter-buffer and logic circuitry. The logic circuitry receives a call-initiation message comprising a jitter-buffer size and adjusts the jitter buffer based on the received call-initiation message.

The present invention additionally encompasses an apparatus comprising logic circuitry receiving a request to set up a call and determining receivers involved in the call, determining an appropriate jitter-buffer size for each receiver involved in the call, and sending a call-initiation message to each receiver involved in the call. The call-initiation message sent to a particular receiver includes a specifically tailored jitter-buffer size for the particular receiver.

Turing now to the drawings, wherein like numerals designate like components, FIG. 1 is block diagram of communication system 100 that utilizes a variable-length jitter buffer. System 100 generally supports two-way or half-duplex radio communication, such commonly used by police, fire, fleet, and other such organizations. For example TETRA or P25 public safety trunked radio systems. However, in alternate embodiments of the present invention, communication system 100 may comprise any type of communication system, including, but not limited to cellular communication systems, local-area networks, wide-area networks, . . . , etc. System 100 utilizes a plurality of base stations or base sites 101-103 which establish an air interface for subscriber radios 105-107 in the vicinity of the base site. Subscriber radios, such as radios 105-107, communicate with base sites 101-103 with which they are affiliated, as controlled by the base site.

As referred to herein, radios 105-107 include, but are not limited to, devices commonly referred to as access terminals, mobile radios, mobile stations, subscriber units, user equipment, mobile devices, or any other device capable of operating in a wireless environment. Examples of wireless communication devices include, but are not limited to, two-way radios, mobile phones, cellular phones, Personal Digital Assistants (PDAs), laptops and two-way pagers.

Base stations 101-103 are part of a fixed network infrastructure and can receive information (either control or media, e.g., data, voice (audio), video, etc.) in a signal from a radio and transmit information in signals to one or radios within communication system 100. Base stations 101-103 can also receive information from network 108 via backhaul 109-111.

Backhauls 109-111 can be utilized to transmit information from one base station to another or from a base station to other network equipment, such as land-line equipment. Backhauls 109-111 are can be hardwired or wireless, and can utilize one of multiple backhaul protocols, such as, but not limited to internet protocol, Multi-Protocol Label Switching (MPLS) protocol, MPLS best effort protocol, E1 protocol, or a very small aperture terminals (VSATs) protocol.

Although network 108 is shown as a single network, in actuality, network 108 may comprise multiple networks, such as, but not limited to wide-area networks, local-area networks, . . . , etc., each network utilizing a different protocol and/or transmission media for transport.

Base stations 101-103 assign channels, broadcast control information, and can act as a radio-to-land line interface point. Each base site comprises a base site controller (not shown) and a base site transceiver (not shown), along with antennas, power equipment, and other such conventional components, as is known. The base site controller administers operation of the radio interface and keeps track of information necessary for such operation. The base site transceiver includes the radio equipment for modulation and demodulation, frequency generation, timing, and so on.

Each radio 105-107 comprises a radio transceiver (not shown), interface means for operating the radio such as buttons, adjustment knobs, graphical display, as well as audio processing circuitry, memory, and other circuitry and software necessary for operation. Generally, a subscriber radio has a push to talk (PTT) button for commencing transmission to a selected party, talk group, or multi-group. Each radio also has a unique identifier that it uses in communication activity so that the system can identify and address it.

During operation, some base stations 101-103 may be utilizing one form of backhaul, while in direct communication with another base station utilizing a second form of backhaul, each backhaul providing varying Quality of Service (QoS). For example, base stations 101-103 utilizing an Ethernet backhaul across the internet will typically have lesser QoS if compared to base stations 101-103 utilizing a leased line backhaul.

For system 100 employing at least one base station with a low QoS, a large static jitter buffer can be designed into the base stations 101-103 to optimize performance against large amounts of network delay jitter at the cost of large delays which will be noticed by users. On the other hand, for systems employing all base stations with high QoS, a small jitter buffer can be used which will introduce minimal delays but at the cost of significant packet loss. In this case, call quality degrades when the network jitter exceeds the size of the jitter buffer.

As described above, there exists a tradeoff between long delays/low packet loss and short delays/higher packet loss. In order to determine an appropriate buffer size that optimizes system performance, each base station will be assigned a buffer size by controller 104.

Controller 104 (which preferably comprises a call controller) assigns each base station 101-103 a jitter-buffer size on a per call, or even per call/speech segment. A different size jitter buffer may be used at each base station 101-103. Information on each base station's backhaul QoS is loaded and stored onto controller 104, and then used as part of the call granting. In one embodiment, QoS comprises a maximum backhaul delay variation allowed for the backhaul type being used, with a high QoS having a lower backhaul delay variation. However, in alternate embodiments QoS may comprise other indicators of link quality, such as bit error rate, frame error rate, amount of buffer overruns, . . . , etc. Additionally, controller 104 could actively monitor a time-varying QoS of each backhaul link. This could be accomplished by controller 104 monitoring a router at an interface to the backhaul (at the system controller end) or it could be the base station itself (at the base station end). Controller 104 could then determine jitter factors based on time averaged statistics (e.g., jitter buffer overrun statistics at the base station). In another embodiment, controller 104 could monitor the jitter of a link via an extension of its keep alive protocol to enable controller 104 to build a more realistic jitter factor that could then be used in its database.

Controller 104 determines QoS parameters for the source of the call. Controller 104 then determines QoS parameters for the receiver of the call. Controller 104 determines an optimal jitter buffer and sends the jitter-buffer size to all recipients of the call as part of a call grant message. For the duration of the speech segment, the jitter buffers would be static.

In one embodiment of the present invention the jitter-buffer size comprises a summation of the source and the receive QoS as a function of maximum jitter (time variation of a received signal) allowed for each backhaul utilized. Consider the following system of five base stations illustrated in table 1.

TABLE 1

Jitter adjustments for each base site used in a call

| | Backhaul | QoS (Jitter) | Jitter factor |
|---|---|---|---|
| Site 1 | Internet | <100 ms | 95 |
| Site 2 | MPLS (premium) | <5 ms | 0 |
| Site 3 | MPLS (best effort) | <15 ms | 10 |
| Site 4 | E1 | negligible | 0 |
| Site 5 | VSAT | negligible | 0 |

In the above table, controller 104 will utilize a jitter factor to adjust each buffer within each base station above its default size. In this example, negligible jitter (QoS) or jitter under 5 milliseconds will result in no adjustment. Jitter >5 ms would have a "pro rata" like jitter factor. i.e., 15 ms=10, 100 ms=95, 200 ms=195 and so on.

As an example, assume that Site 2 initiates a call. Site 4 and 5 are to receive the call. Controller 104 will send no jitter adjustment to the sites involved in the call since their jitter factors remain zero. Jitter buffers will remain at a default size. If Site 1 joins the call as late entry, upon sending the group grant to this site, a jitter factor of 95 is sent to this site. It joins the call with a jitter buffer of "default"+95 ms. This site will enjoy jitter free communications, but with an increased delay of 95 ms on the receive at this site. (negating the natural latency of the link).

If Site 2 releases the call transmission, and Site 3 joins the group call (a roamed subscriber arrives) just before a subscriber at Site 1 decides to transmit. Then Sites 2, 3, 4, 5 are the receivers of the call. Controller 104 will send group grant with the following adjustments (which comprise a summation of each sites QoS):

Site 2=95
Site 3=105 (95+10)
Site 4=95
Site 5=95

FIG. 2 is block diagram of a base station that may be utilized to adjust its jitter buffer as described above. As shown, the base station comprises logic circuitry 203 (microprocessor 203), receive circuitry 202, and transmit circuitry 201. Logic circuitry 203 comprises a digital signal processor (DSP), general purpose microprocessor, a programmable logic device, or application specific integrated circuit (ASIC) and serves as means for analyzing message content to determine a size of buffer 205. Additionally receive and transmit circuitry are common circuitry known in the art for communication to radios 105-107 utilizing a well known communication protocol, and serve as means for transmitting and receiving messages. For example, receiver 202 and transmitter 201 are well known transmitters that utilize the Digital Mobile Radio (DMR) air interface standard, which specifies various protocols used by two-way radios (that can both transmit and receive signals) at the data link layer (i.e., layer 2).

FIG. 3 is a flow chart showing operation of the base station of FIG. 2. The logic flow begins at step 301 where logic circuitry 203 receives a call origination message from controller 104 and properly decodes the message. As discussed above, the call origination message contains an appropriate buffer size for buffer 205. In response, logic circuitry 203 adjusts buffer 205 to the appropriate size (step 303). Participation in the call utilizing transmitter 201 and receiver 202 then take place at step 305. As discussed above, the appropriate buffer size will be a combination of QoS factors for each backhaul participating in the call.

Figure 4:
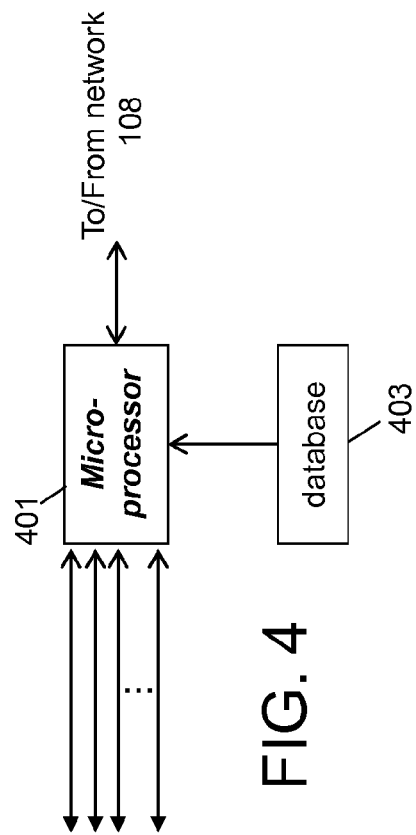
FIG. 4 is block diagram of a call controller that may be utilized to adjust jitter buffers for various base stations.

FIG. 4 is block diagram of a call controller that may be utilized to adjust jitter buffers for various base stations as described above. As shown, the call controller comprises logic circuitry 401 (microprocessor 401) and database 403. Database 403 comprises standard random access memory and is used to store information related to store QoS information about various base stations under its control.

Logic circuitry 401 comprises a digital signal processor (DSP), general purpose microprocessor, a programmable logic device, or application specific integrated circuit (ASIC) and is utilized to receive a call request, accesses database 403, and set up the call with the appropriate jitter-buffer sizes.

FIG. 5 is a flow chart showing operation of the call controller of FIG. 4. The logic flow begins at step 501 where logic circuitry 401 receives a request to set up a call. The call setup request may simply be to set up a call between two radios, to add a radio to an existing call, or to set up a group call involving multiple base stations. Regardless of the type of call to be set up, logic circuitry 401 determines all base stations involved in the call (step 503) and then determines an appropriate jitter-buffer size for each base station (step 505). As discussed above, the jitter-buffer size for each base station involved in the call may differ from each other.

Once an appropriate jitter-buffer size is determined, a call-initiation message is sent by logic circuitry 401 to each base station participating in the call (step 507). As discussed above, the call-initiation (or call grant) message for a particular base station comprises a jitter-buffer size for the particular base station.

In determining the appropriate jitter-buffer size, logic circuitry 401 accesses internal memory to determine a Quality of Service (QoS) for each backhaul involved in the call and determines the appropriate jitter-buffer size based on the QoS for each backhaul involved in the call. The appropriate jitter-buffer size comprises a summation of the QoS for each backhaul involved in the call, with the QoS comprising a maximum variation in delay allowed for each backhaul. The summation may be scaled by a quality factor.

The jitter-buffer size is based on at least a first backhaul capacity of a first base station, and a second backhaul capacity of a second base station. In an embodiment of the present invention, the backhaul capacity comprises a measure of maximum delay variation for each backhaul, and the jitter-buffer size is a summation of the delay variation for a first and a second base station, possibly adjusted by a scaling factor.

Thus, in a point-to-multipoint communication system, where a source base station transmits signals that are relayed to multiple destination base stations, each source/destination base station combination results in a particular (and possibly different) jitter-buffer size for the destination base station. When the above technique is applied to point-to-point communication systems, the jitter-buffer size of the destination base station will be a combination of the transmitting QoS and the receiving QoS, as discussed above.

As discussed above, controller 104 adjusts a jitter-buffer size for all base stations participating in the call based on the backhaul capabilities of each base station. However, in alternate embodiments of the present invention, controller 104 can utilize other criteria for adjusting base station's buffer size. For example, while the above system had the base station providing the jitter buffer, in alternate embodiments of the present invention a jitter buffer may be located within subscriber radios 105-107 and adjusted as described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for jitter buffering within a communication system, the method comprising the steps of:
receiving a request to set up a call;
determining base stations involved in the call;
determining an appropriate jitter-buffer size for each base station involved in the call, wherein the jitter-buffer size for each base station involved in the call may differ from each other, and wherein the step of determining the appropriate jitter-buffer size comprises the step of determining a summation of a QoS for each backhaul involved in the call and basing the jitter-buffer size as a function of the summation of the QoS for each backhaul involved in the call, wherein more than one backhaul is involved in the call; and
sending a call-initiation message to each base station involved in the call, wherein the call-initiation message sent to a particular base station includes the jitter-buffer size for the particular base station;
sending a second call-initiation message when another base station joins the call, wherein the second call-initiation message sent to the particular base station includes a second specifically tailored jitter-buffer size for the particular base station that is based on a backhaul QoS for the another base station.

2. The method of claim 1 wherein the step of determining an appropriate jitter-buffer size comprises the steps of:
accessing internal memory to determine the Quality of Service (QoS) for each backhaul involved in the call; and
determining the appropriate jitter-buffer size based on the QoS for each backhaul involved in the call.

3. The method of claim 2 wherein the QoS comprises a variation in delay.

4. The method of claim 2 wherein the summation of the QoS for each backhaul involved in the call is scaled by a quality factor.

5. The method of claim 2 wherein the QoS comprises variation in a delay.

6. The method of claim 1 wherein the controller determines the jitter buffer size for each base station involved in the call on a per call or a per call/speech segment basis.

7. A method for jitter buffering within a communication system, the method comprising the steps of:
receiving at a controller, a request to set up a call;
determining base stations involved in the call;
determining an appropriate jitter-buffer size for each base station involved in the call, wherein the jitter-buffer size for each base station involved in the call may differ from each other, and wherein the step of determining the appropriate jitter-buffer size comprises the step of determining a summation of a QoS for each backhaul involved in the call and basing the jitter-buffer size as a function of the summation of the QoS for each backhaul involved in the call, wherein more than one backhaul is involved in the call; and
sending a call-initiation message to each base station involved in the call, wherein the call-initiation message sent to a particular base station includes a specifically tailored jitter-buffer size for the particular base station;

sending a second call-initiation message when another base station joins the call, wherein the second call-initiation message sent to the particular base station includes a second specifically tailored jitter-buffer size for the particular base station that is based on a backhaul QoS for the another base station.

8. The method of claim 7 wherein the step of determining base stations involved in the call comprises the step of determining base stations involved in the call.

9. The method of claim 7 wherein the step of determining an appropriate jitter-buffer size comprises the steps of:

accessing internal memory to determine the Quality of Service (QoS) for each backhaul involved in the call; and determining the appropriate jitter-buffer size based on the QoS for each backhaul involved in the call.

10. The method of claim 9 wherein the step of determining the appropriate jitter-buffer size comprises the step of determining a summation of the QoS for each backhaul involved in the call.

11. The method of claim 10 wherein the QoS comprises a variation in delay.

12. The method of claim 10 wherein the summation of the QoS for each backhaul involved in the call is scaled by a quality factor.

13. The method of claim 10 wherein the QoS comprises a variation in delay.

14. The method of claim 7 wherein the controller determines the jitter buffer size for each base station involved in the call on a per call or a per call/speech segment basis.

15. An apparatus comprising:

logic circuitry receiving a request to set up a call, determining base stations involved in the call, determining an appropriate jitter-buffer size for each base station involved in the call, wherein the jitter-buffer size for each base station involved in the call may differ from each other, and sending a call-initiation message to each base station involved in the call, wherein the call-initiation message sent to a particular base station includes a specifically tailored jitter-buffer size for the particular base station, and wherein the jitter-buffer size comprises a summation of a QoS for each backhaul involved in the call, wherein more than one backhaul is involved in the call, and wherein a second call-initiation message is sent by the logic circuitry when another base station joins the call, wherein the second call-initiation message sent to a particular base station includes a second specifically tailored jitter-buffer size for the particular base station that is based on a backhaul QoS for the another base station.

16. The apparatus of claim 15 wherein each base station involved in the call comprises a base station involved in the call.

* * * * *